United States Patent [19]
Kumagai

[11] Patent Number: 4,870,587
[45] Date of Patent: Sep. 26, 1989

[54] METHOD OF DISCRIMINATING A STROKE OF A 4-CYCLE INTERNAL COMBUSTION ENGINE

[75] Inventor: Chiaki Kumagai, Tokorozawa, Japan

[73] Assignee: Honda Giken Kogyo Kabushiki Kaisha, Tokyo, Japan

[21] Appl. No.: 122,087

[22] Filed: Nov. 17, 1987

[30] Foreign Application Priority Data

Nov. 28, 1986 [JP] Japan .................................. 61-283929

[51] Int. Cl.$^4$ ............................ F02P 5/04; F02B 3/04
[52] U.S. Cl. ................................ 364/431.07; 123/414;
 123/419; 123/617; 123/643; 364/431.03
[58] Field of Search ....................... 123/412, 416–419,
 123/424, 612, 617, 618, 643; 364/431.03, 431.07

[56] References Cited

U.S. PATENT DOCUMENTS

| 4,452,205 | 6/1984 | Takasu et al. ...................... 123/419 |
| 4,471,653 | 9/1984 | Kawamura et al. ............ 123/612 X |
| 4,570,594 | 2/1986 | Egami et al. ........................ 123/414 |
| 4,660,534 | 4/1987 | Cotignoli ........................... 123/643 |
| 4,765,306 | 8/1988 | Scarnera et al. .................... 123/643 |

Primary Examiner—Felix D. Gruber
Attorney, Agent, or Firm—Armstrong, Nikaido Marmelstein Kubovcik & Murray

[57] ABSTRACT

An engine stroke discriminating method and apparatus for a 4-cycle internal combustion engine which discriminates a stroke of the engine with accuracy, the method and apparatus being simple in construction and low in cost. The stroke discriminating method and apparatus is characterized by taking advantage of the fact that the rotational speed of a crankshaft after the top dead center of a cylinder of an engine rises substantially relative to that before the top dead center in a compression stroke of the cylinder but does not rise in an exhaust stroke. The stroke of the engine is thus, discriminated by determining the difference in rotational speed of the crankshaft before and after the top dead center of the cylinder.

7 Claims, 5 Drawing Sheets

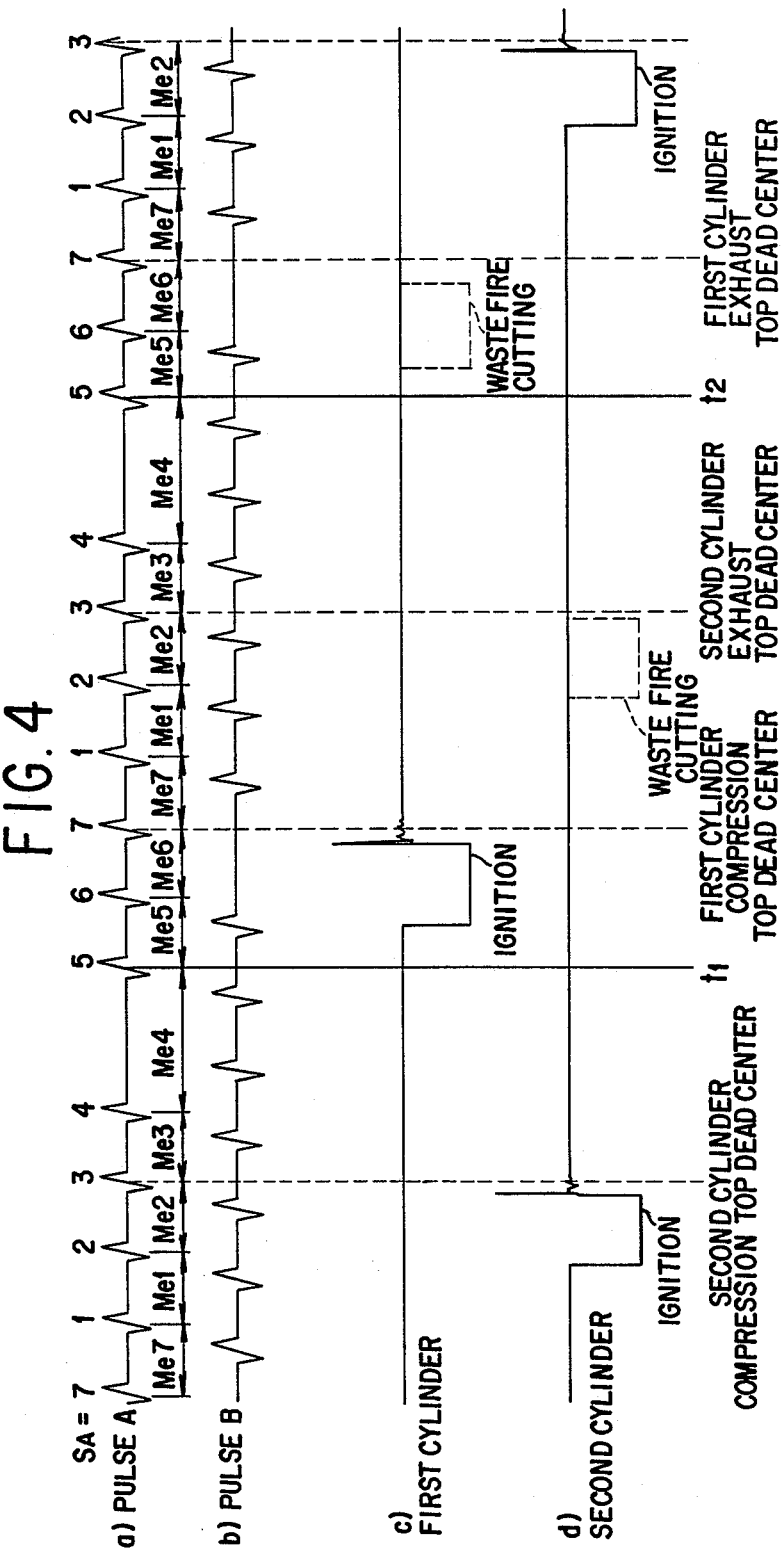

METHOD OF DISCRIMINATING A STROKE OF A 4-CYCLE INTERNAL COMBUSTION ENGINE

BACKGROUND OF THE INVENTION

1. Field of the Invention

The invention relates to an engine stroke discriminating method and apparatus for controlling the ignition timing and/or the fuel injection timing of a 4-cycle internal combustion engine.

2. Description of the Prior Art

In some conventional ignition systems of 4-cycle internal combustion engines, the ignition timing is set in accordance with the rotational angle of the crankshaft. In an ignition system of this type, ignition is produced for every two rotations of the crankshaft during each compression stroke. If a spark is produced at an ignition plug at a predetermined rotational angle of the crankshaft, an additional spark, that is, a waste firing, will occur in the exhaust stroke. In order to prevent such an additional spark, it is necessary to detect or discriminate between the different strokes of the engine. Japanese Patent Publication No. 60-20583 discloses an ignition system wherein a rotational position detecting sensor is provided for a half rotation member such as a camshaft which makes one full rotation for each two crankshaft rotations. An ignition pulse is provided only during a compression stroke in accordance with the result of detection of a predetermined rotational angular position of the half rotation member such as the camshaft. However, since the ignition system requires provision of the rotational position detecting sensor on the half rotation member, there is a problem in that the output portion of the crankshaft is complicated in construction and accordingly has a high production cost. This also applies to an ignition system of an internal combustion engine of the fuel injection type wherein fuel injection timing for injecting fuel once during each one cycle (suction, compression, explosion and exhaust) of the engine is set for each of the cylinders of the engine.

SUMMARY OF THE INVENTION

Accordingly, it is an object of the present invention to provide an engine stroke discriminating method and apparatus for a 4-cycle internal combustion engine which discriminates a stroke of the engine with accuracy, the method and apparatus being simple in construction and low in cost.

The stroke discriminating method and apparatus of the present invention is characterized by taking advantage of the fact that the rotational speed of a crankshaft after the top dead center of a cylinder of an engine rises substantially relative to the rotational speed before the top dead center in a compression stroke of the cylinder but does not rise in an exhaust stroke. The stroke of the engine is thus discriminated by determining the difference in rotational speed of the crankshaft before and after the top dead center of the cylinder.

BRIEF DESCRIPTION OF THE DRAWINGS

FIG. 4 is a waveform diagram illustrating the operation of the system of FIG. 1.

DETAILED DESCRIPTION OF THE PREFERRED EMBODIMENT

Figure 1:
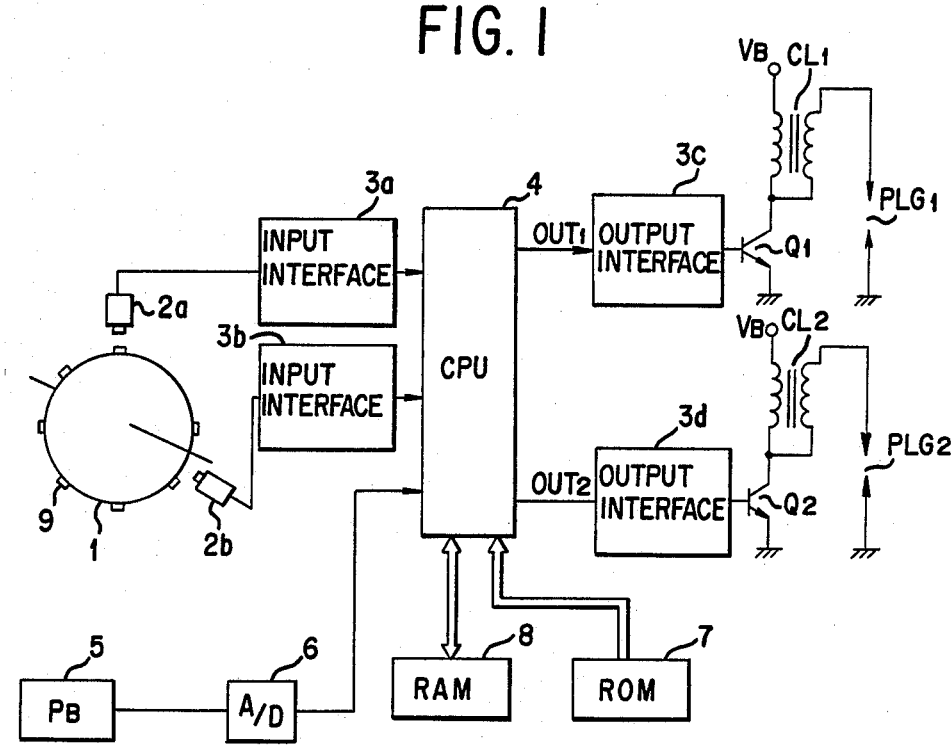
FIG. 1 is a block diagram of an ignition system incorporating a stroke discriminating method and apparatus of the present invention.

FIG. 1 illustrates an ignition system of a 2-cylinder 4-cycle internal combustion engine having the engine stroke discriminating method and apparatus of the present invention. In the ignition system shown, up to seven projections 9 are located at angular positions 45 degrees apart on the outer periphery of a rotary member 1 which rotates in synchronism with a crankshaft of the engine (not shown). A pair of pulse generators 2a and 2b are located at different positions adjacent the outer periphery of the rotary member 1 for electromagnetically cooperating with the projections 9 on the rotary member 1 to generate a pulse train A and a pulse train B, respectively. The plurality of projections 9 and the pulse generators 2a and 2b thus form a rotational position detecting sensor. It is to be noted that the pulse trains A and B may otherwise be obtained by photoelectric transducer means, for example. The pulse train A and the pulse train B are either shaped in their waveform or adjusted in level by input interface circuits 3a and 3b, respectively, and are applied to the input ports of a CPU 4 of a microcomputer. Meanwhile, a $P_B$ signal indicating the vacuum pressure of the engine is applied from a $P_B$ sensor 5 to an A/D converter 6 which provides a digital $P_B$ signal, for example, of 16 bits, to the CPU 4. The CPU 4 calculates in synchronism with clock pulses from a clock generator (not shown) to determine an energization starting time and a deenergizing time in accordance with a program stored in a ROM 7 in response to the received data of the pulse trains A and B as well as the $P_B$ signal. At the energization starting time and the deenergizing time thus determined, outputs of logic values "1" and "0" are supplied, respectively, from output port $OUT_1$ of the CPU 4 to a transistor $Q_1$ via an output interface circuit 3c and from output port $OUT_2$ to transistor $Q_2$ via output interface circuit 3d. When a logic "1" signal (ON signal) is received at the base of the transistor $Q_1$, the transistor $Q_1$ is rendered conducting so that current will flow in the primary winding of ignition coil $CL_1$. When a logic "0" signal (OFF signal) is received at the base of the transistor $Q_1$, the transistor $Q_1$ is turned off so that a high voltage appears in the secondary winding of the ignition coil $CL_1$ causing an arc to appear in the gap of ignition plug $PLG_1$ resulting in ignition in the first cylinder. Similarly, when a logic "1" signal (ON signal) is received at the base of the transistor $Q_2$, the transistor $Q_2$ is rendered conducting so that current will flow in the primary winding of ignition coil $CL_2$. When a logic "0" signal (OFF signal) is received at the base of the transistor $Q_2$, the transistor $Q_2$ is cut off so that a high voltage appears in a secondary winding of the ignition coil $CL_2$ causing an arc in a gap of an ignition plug $PLG_2$ resulting in ignition in the second cylinder.

Now, the operation of the CPU 4 will be described.

Figure 2:
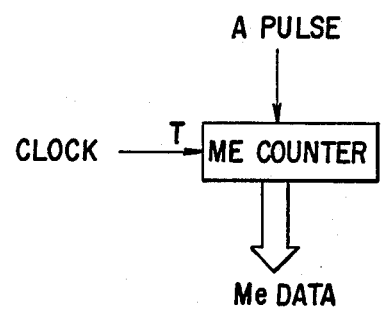
FIG. 2 is a block diagram illustrating a counter included in the CPU of the ignition system of FIG. 1.

The CPU 4 includes a built-in Me counter (FIG. 2) which is reset by the rear edge of a pulse A and counts clock pulses from the pulse generator. Thus, the count value Me of the Me counter at the time of the rear edge of a pulse A indicates a pulse interval which is equal to the reciprocal to the instantaneous value Ne of the engine rotational speed. The Me counter, thus provides data indicating $Me=1/Ne$ as a means of detecting an instantaneous speed of the engine.

Figure 3A:
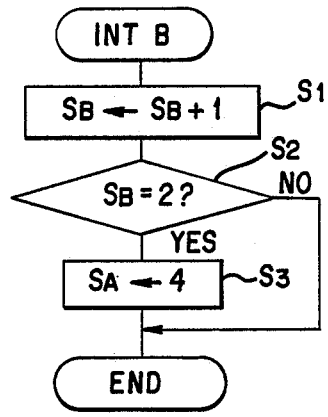
FIGS. 3(a)-3(c) are flow charts illustrating operation of the CPU.
Figure 3B:
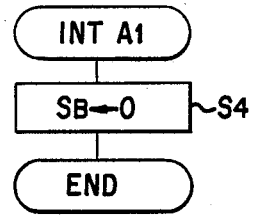
Figure 3C:
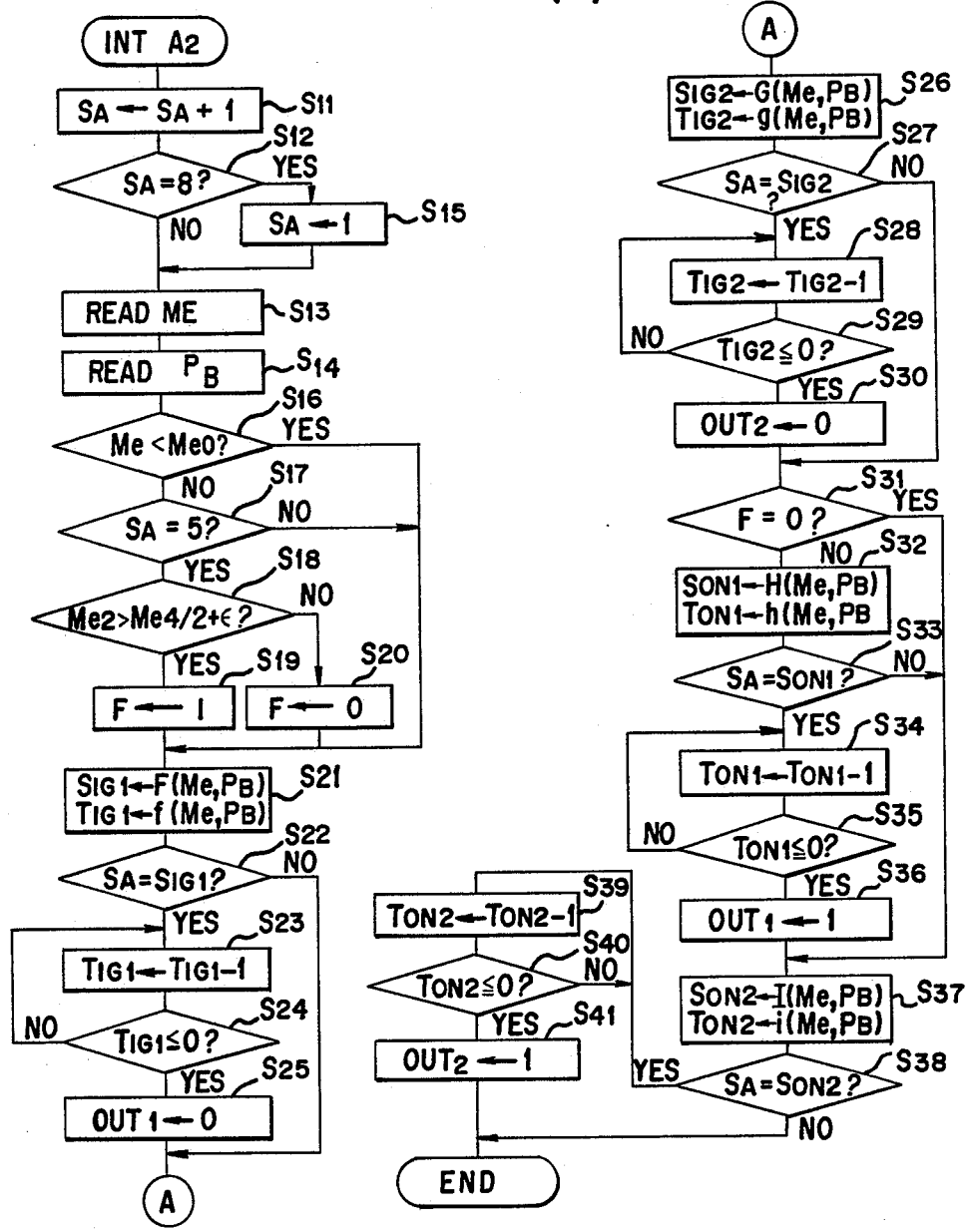

Meanwhile, the CPU 4 controls energization starting and deenergization as described above in accordance with flow charts shown in FIGS. 3(a) to 3(c). In particular, in the subroutine of FIG. 3(a) which is initiated as a result of interruption by reception of each pulse B, the count value $S_B$ of a built-in stage counter B is incremented by one step ($S_1$), and then the CPU 4 determines whether or not the count value $S_B$ is equal to 2 (step $S_2$) When $S_B=2$, the count value $S_A$ of another built-in stage counter A is set to "4" (step $S_3$). The pulse generator 2a is arranged such that the first cylinder may assume its top dead center position when $S_A=7$ and the second cylinder may assume its top dead center position when $S_A=3$ as seen in FIG. 4. The other pulse generator 2b is located at an advanced position at an angle greater than 90 degrees but smaller than 120 degrees with respect to the pulse generator 2a in a direction of rotation of the crankshaft. Accordingly, the stage counter B which counts the pulses B is reset each time a pulse A is produced as seen in FIG. 3(b) (step $S_4$). Consequently, the count value $S_B$ of the stage counter B exhibits "2" only within an interval of time from a point of time when $S_A=4$ to another point of time just before $S_A=5$ is reached. Accordingly, the count value $S_A$ of the stage counter A can be initialized to $S_A=4$. It is to be noted that, directly after starting a cranking operation of the engine, the subroutines of FIGS. 3(a) and 3(b) are executed until the crankshaft makes at most one full rotation and the initialization of $S_A=4$ is completed.

Figure 5:
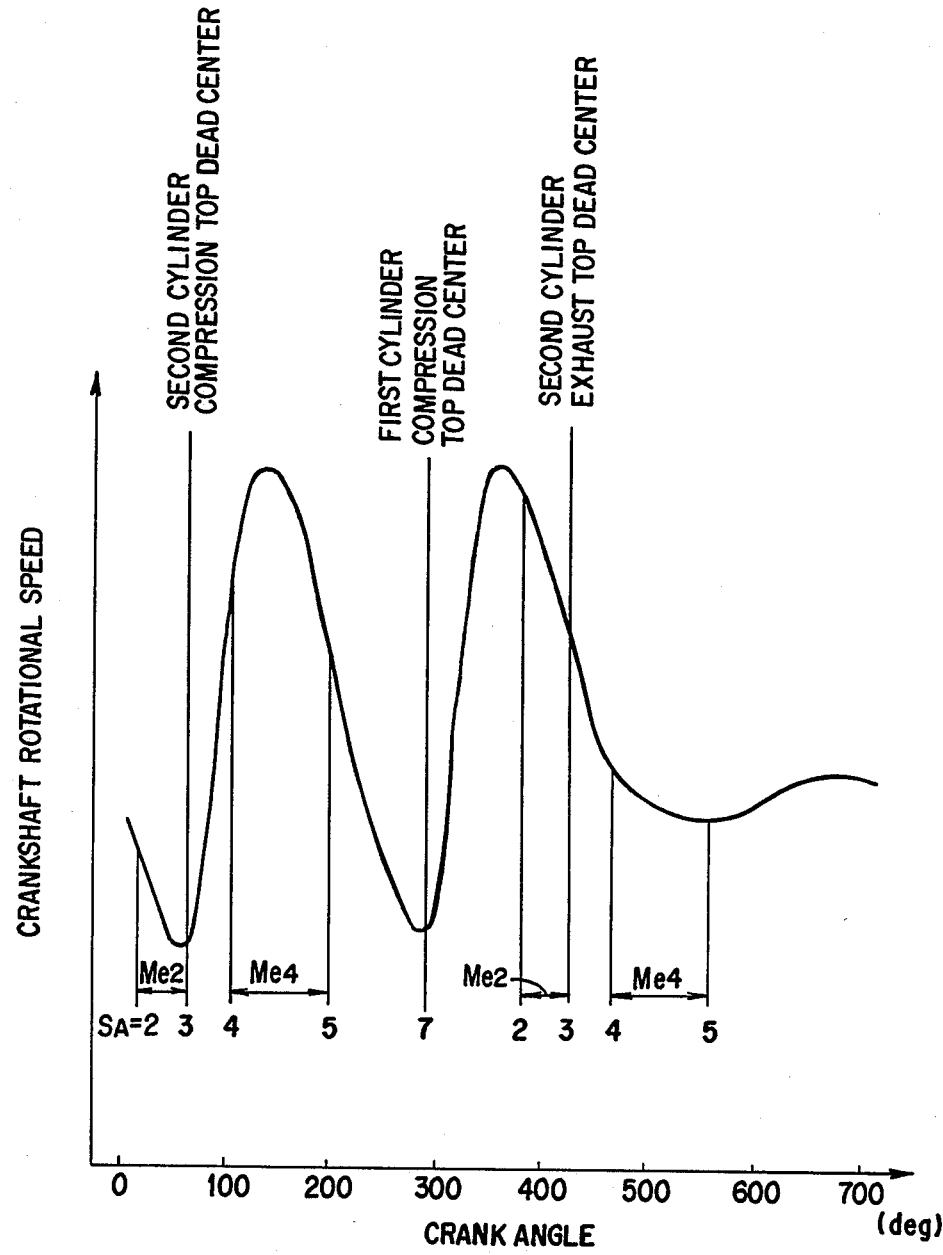
FIG. 5 is a diagram illustrating the changing of the rotational speed of a crankshaft.

A subroutine shown in FIG. 3(c) is initiated by interruption each time a pulse A is produced after the initialization of $S_A=4$. In the subroutine shown, at first the count value $S_A$ of the stage counter A is incremented by "1" (step $S_{11}$), and then it is determined whether or not the count value $S_A$ is equal to "8" (step $S_{12}$). When $S_A=8$, the count value Me of the Me counter and the vacuum pressure $P_B$ are respectively read into the CPU 4 (steps $S_{13}$ and $S_{14}$). However, if $S_A \ne 8$, then the count value $S_A$ of the stage counter A is set to "1" (step $S_{15}$) whereafter the steps $S_{13}$ and $S_{14}$ are executed to read the count value Me of the Me counter and the vacuum pressure $P_B$ into the CPU 4. Each time the count value Me of the Me counter is read in, it is stored in a predetermined location of RAM 8 corresponding to the count value $S_A$. Successive values of $Me_1$ to $Me_7$ as shown in FIG. 4 successively update the stored contents of the RAM 8. After reading the data, it is determined whether or not the count value Me is equal to or smaller than a predetermined value $Me_0$ (step $S_{16}$) In case $Me \geq Me_0$, this indicates that the rotational speed of the engine is low, and accordingly, it is determined whether or not the count value $S_A$ of the stage counter A is equal to "5" (step $S_{17}$). When $S_A=5$, this indicates that it is directly after the crankshaft has rotated an angle of 135 degrees from the top dead center position of the second cylinder (that is, an angle of 270 degrees from the top dead center position of the first cylinder), and thus, the count values $Me_2$ and $Me_4$ are read out from the RAM 8 and the count value $Me_4$ is divided by "2" and a predetermined value $\epsilon$ is added thereto to obtain a calculated value, whereafter it is determined whether or not the count value $Me_2$ is greater than the calculated value (step $S_{18}$). In case $Me_2 > Me_4/2 + \epsilon$, the CPU 4 determines that the top dead center position of the second cylinder is top dead center after a compression stroke of the second cylinder (which may be hereinafter referred to as compression top dead center), and thus, sets "1" to a flag F (step $S_{19}$) as a means of discriminating the compression stroke. When $Me_2 \leq Me_4/2 + \epsilon$, the CPU 4 determines that the top dead center position of the second cylinder is top dead center after an exhaust stroke of the second cylinder (which may hereinafter be referred to as exhaust top dead center), and thus resets the flag F to "0" (step $S_{20}$). Since the rotational speed of the crankshaft is substantially lower when the top dead center position is reached in a compression stroke than when it is reached in an exhaust stroke as shown in FIG. 5, the count value $Me_2$ represents a rotational speed of the crankshaft just before the top dead center of the second cylinder while the count value $Me_4$ after the suction top dead center of the second cylinder is smaller than that after the exhaust top dead center and meets $Me_2 > Me_4/2 + \epsilon$ whereas the count value $Me_4$ after the exhaust top dead center meets $Me_2 \leq Me_4/2 + \epsilon$. Accordingly, where the flag F is set to $F=1$ at step $S_{19}$, ignition is effected at the first cylinder while elimination of waste firing is effected at the second cylinder. However, where the flag F is reset to $F=0$ at step $S_{20}$, elimination of waste firing is effected at the first cylinder while ignition is effected at the second cylinder It is to be noted that, when $Me < Me_0$ at step $S_{16}$, or in case $S_A \ne 5$ at step $S_{17}$, the CPU 4 bypasses the steps or setting and resetting the flag F and advances directly to a subsequent ignition timing setting sequence. When $Me < Me_0$, however, it is preferable to supply current to the ignition coils $CL_1$ and $CL_2$ irrespective of contents of the flag F.

In the ignition timing setting sequence, functional values $F(Me, P_B)$ and $f(Me, P_B)$ are first placed into an ignition stage count value $S_{IG1}$ for rough setting of ignition timing for the first cylinder and a cutoff trigger count value $T_{IG1}$ for fine setting, respectively (step $S_{21}$). It is to be noted that the functional values $F(Me, P_B)$ and $f(Me, P_B)$ can be stored in advance as MAP values in the ROM 7.

Subsequently, the CPU 4 determines whether or not the stage count value $S_A$ is equal to $S_{IG1}$ (step $S_{22}$), and when $S_A$ is equal to $S_{IG1}$, this indicates that the crank angle is near the ignition angle, and thus the CPU 4 decrements the cutoff trigger count value $T_{IG1}$ by one (step $S_{23}$). After this, the CPU 4 compares the value $T_{IG1}$ with zero (step $S_{24}$), and when $T_{IG1} > 0$, the CPU 4 returns its operation to step $S_{23}$ in order to repeat the decrementing of $T_{IG1}$ by one until it is reduced to zero. Thus, when $T_{IG1} \leq 0$ is reached, this indicates that the ignition timing is reached, and accordingly, the CPU 4 produces a cutoff instruction $OUT_1 = 0$ (step $S_{25}$).

On the other hand, when $S_A$ is not equal to $S_{IG1}$, functional values $G(Me, P_B)$ and $g(Me, P_B)$ are placed into an ignition stage count value $S_{IG2}$ for rough setting of the ignition timing for the second cylinder and a cutoff trigger count value $T_{IG2}$ for fine setting, respectively (step $S_{26}$). *It is to be noted that the functional values $G(Me, PB)$ and $g(Me, P_B)$ can also be stored in advance as MAP values in the ROM 7.*

Subsequently, the CPU 4 determines whether or not the stage count value $S_A$ is equal to $S_{IG2}$ (step $S_{27}$), and when $S_A$ is equal to $S_{IG2}$, this indicates that the crank angle is near the ignition angle, and thus, the CPU 4 decrements the cutoff trigger count value $T_{IG2}$ by one (step $S_{28}$). The CPU 4 then compares the value $T_{IG2}$ with zero (step $S_{29}$), and when $T_{IG2} > 0$, the CPU 4 returns its operation to step $S_{28}$ in order to repeat the decrementing of $T_{IG2}$ by one until it is reduced to or below zero. Thus, when $T_{IG2} \leq 0$ is reached, this indicates that the ignition timing has been reached, and accordingly, the CPU 4 produces a cutoff instruction $OUT_2 = 0$ (step $S_{30}$).

Subsequently, a sequence is entered for determining energization starting timing at which energization of the ignition coils $CL_1$ and $CL_2$ is to be started before actual ignition. In particular, it is determined first whether or not the energization flag F is equal to zero (step $S_{31}$). When $F=1$, this indicates that ignition is to subsequently occur at the first cylinder, and thus, functional values $H(Me, P_B)$ and $h(Me, P_B)$ are placed into an energization starting stage count value $S_{ON1}$ and an energization starting trigger count value $T_{ON1}$, respectively (step $S_{32}$). Subsequently, the stage count value $S_A$ is compared with $S_{ON1}$ (step $S_{33}$), and when they are equal to each other, this indicates that the energization starting stage is reached, and thus $T_{ON1}$ is repeatedly decremented by one until it is reduced to or below zero (steps $S_{34}$ and $S_{35}$). When $T_{ON1} \leq 0$ is reached, the CPU 4 switches output $OUT_1$ to "1" to provide an instruction of energization to the ignition coil $CL_1$ of the first cylinder (step $S_{36}$). However, when $F=0$ at step $S_{31}$, as a means of suppression this indicates that ignition is to subsequently occur at the second cylinder, and thus, functional values $I(Me, P_B)$ and $i(Me, P_B)$ are placed into an energization starting stage count value $S_{ON2}$ and an energization starting trigger count value $T_{ON2}$, respectively (step $S_{37}$). Also, when $S_A = S_{ON1}$ at step $S_{33}$, the step $S_{37}$ is immediately executed. Subsequently, the stage count value $S_A$ is compared with $S_{ON2}$ (step $S_{38}$), and when they are equal to each other, this indicates that the energization starting stage is reached, and thus, $T_{ON2}$ is repeatedly decremented by one until it is reduced to or below zero (steps $S_{39}$ and $S_{40}$). When $T_{ON2} \leq 0$ is reached, the CPU 4 switches output $OUT_2$ to "1" to provide an instruction of energization to the ignition coil $CL_2$ of the first cylinder (step $S_{41}$).

Accordingly, the collector voltages of the transistors $Q_1$ and $Q_2$ exhibit changes as shown in waveforms (c) and (d) of FIG. 4, respectively. Thus, at a point of time $t_1$ where $S_A = 5$, $Me_2 > Me_4/2 + \epsilon$, the CPU 4 determines that the next subsequent top dead center of the first cylinder is the compression top dead center and sets the flag F to $F=1$. Consequently, in the first cylinder, the transistor $Q_1$ is then rendered conducting to allow the ignition coil $CL_1$ to be energized, and then, the transistor $Q_1$ is cut off near the top dead center position. Consequently, a high voltage appears in the secondary winding of the ignition coil $CL_1$ and causes the ignition plug $PLG_1$ to produce a spark for ignition. In the meantime, the CPU 4 determines that the subsequent next top dead center in the second cylinder is the exhaust top dead center, and accordingly, the cutoff condition of the transistor $Q_2$ is maintained thus avoiding waste firing. However, at a point of time $t_2$ where $S_A = 5$ after one full rotation of the crankshaft from the point $t_1$, $Me_2 \leq Me_4/2 + \epsilon$ stands, and accordingly, the CPU 4 determines that the next subsequent top dead center of the second cylinder is the compression top dead center and resets the flag F to $F=0$. Consequently, in the second cylinder, the transistor $Q_2$ is rendered conducting to allow the ignition coil $CL_2$ to be energized, and then, the transistor $Q_2$ is cut off. A high voltage thus appears in the secondary winding of the ignition coil $CL_2$ and causes the ignition plug $PLG_2$ to produce a spark for ignition. Meanwhile, the CPU 4 determines that the subsequent next top dead center in the first cylinder is the exhaust top dead center, and accordingly, the cutoff condition of the transistor $Q_1$ is maintained thus avoiding waste firing.

It is noted that while in the embodiment of the present invention described above, a stroke of the engine is determined by a changing condition of the rotational speed of the crankshaft in order to avoid waste firing and cause ignition only at an appropriate timing, it is also possible to discriminate a suction stroke or some other stroke of each cylinder of an engine in a similar manner from a changing condition of the rotational speed of the crankshaft in order to cause fuel injection only at an appropriate timing.

As is apparent from the foregoing description, according to a stroke discriminating or determinating method and apparatus of a 4-cycle internal combustion engine, rotational speeds of a crankshaft before and after the top dead center position are compared to each other to discriminate a stroke of the engine. Accordingly, the method and apparatus requires provision of only a rotational position detecting sensor on the crankshaft and does not require a rotational position detecting sensor on a member such as a camshaft which rotates in synchronism with the crankshaft as in a conventional apparatus. This allows simplification in construction of the apparatus and a reduction in cost.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

I claim:

1. A method of determining different engine strokes in a 4-cycle internal combustion engine, said method comprising the steps of:
   detecting the speed of rotation of the crankshaft of the engine at predetermined points before and after a piston of the engine is at a top dead center position; and
   comparing the detected speeds of rotation of the crankshaft with predetermined values wherein the detected speeds are different for different engine strokes so that the different strokes of the engine can be determined from one another.

2. An engine stroke discriminating method according to claim 1, further comprising the step of determining the different engine strokes from one another only in a low rotational speed region of the engine.

3. A control circuit for a 4-cycle internal combustion engine, including a stroke discriminating means, said stroke discriminating means comprising a crank signal generator for generating a signal indicative of an angular position of a crankshaft in response of rotation of detecting an instantaneous speed of said crankshaft between predetermined angular positions of said crankshaft before a piston of the engine is at a top dead center position, wherein said stroke discriminating means determines that a present stroke is a compression stroke when the instantaneous speed of said crankshaft detected by said instantaneous speed detecting means is above a predetermined value.

4. A control circuit for a 4-cycle internal combustion engine according to claim 3, further comprising a suppressing means for suppressing a control output of said control circuit when said stroke descriminating means determines that the engine stroke is an exhaust stroke when the instantaneous speed of said crankshaft detected by said instantaneous speed detecting means is above a predetermined value.

5. A control circuit for a 4-cycle internal combustion engine according to claim 3, wherein the control output of said control circuit is an igniting output.

6. A control circuit for a 4-cycle internal combustion engine according to claim 3, wherein the control output of said control circuit is a signal for controlling the fuel injection of said engine.

7. A control circuit for a 4-cycle internal combustion engine according to claim 3, wherein said instantaneous speed detecting means first measures time intervals between adjacent signals successively generated by said crank signal generator at predetermined angular positions of said crankshaft and then compares the measured intervals of time with an interval of time between adjacent signals at a predetermined angular position of said crankshaft in the compression stroke and an exhaust stroke of the engine.

* * * * *